(12) United States Patent
Will et al.

(10) Patent No.: US 10,763,049 B2
(45) Date of Patent: Sep. 1, 2020

(54) CAPACITOR COMPONENT

(71) Applicant: EPCOS AG, Munich (DE)

(72) Inventors: Norbert Will, Heidenheim (DE); Fabio Augusto Bueno De Camargo Mello, Munich (DE); Igor Peretta, Porto Alegre (BR); Paulo Faria, Gravatai (BR)

(73) Assignee: EPCOS AG, Munich (DE)

( * ) Notice: Subject to any disclaimer, the term of this patent is extended or adjusted under 35 U.S.C. 154(b) by 87 days.

(21) Appl. No.: 16/067,583

(22) PCT Filed: Dec. 29, 2016

(86) PCT No.: PCT/EP2016/082854
§ 371 (c)(1),
(2) Date: Jun. 29, 2018

(87) PCT Pub. No.: WO2017/114905
PCT Pub. Date: Jul. 6, 2017

(65) Prior Publication Data
US 2019/0006118 A1 Jan. 3, 2019

(30) Foreign Application Priority Data
Dec. 30, 2015 (DE) ........................ 10 2015 122 977

(51) Int. Cl.
H01G 9/15 (2006.01)
H01G 4/32 (2006.01)
H01G 9/145 (2006.01)
H01G 9/06 (2006.01)

(52) U.S. Cl.
CPC ............... *H01G 9/151* (2013.01); *H01G 4/32* (2013.01); *H01G 9/145* (2013.01); *H01G 9/06* (2013.01)

(58) Field of Classification Search
CPC ........ H01G 9/008; H01G 9/145; H01G 9/151; H01G 4/32
USPC ......................................... 361/511, 530, 517
See application file for complete search history.

(56) References Cited

U.S. PATENT DOCUMENTS

| 4,639,832 | A | 1/1987 | Behn |
| 5,448,448 | A | 9/1995 | Fujiwara et al. |
| 6,310,764 | B1 | 10/2001 | Will et al. |
| 8,400,757 | B2 | 3/2013 | Fujimoto |
| 8,529,641 | B2 | 9/2013 | Kawakubo |
| 2004/0246652 | A1* | 12/2004 | Will ......................... H01G 9/06 361/271 |
| 2011/0157778 | A1* | 6/2011 | Fujimoto ............... H01G 9/008 361/531 |

(Continued)

FOREIGN PATENT DOCUMENTS

| CN | 102208287 A | 10/2011 |
| CN | 102222570 A | 10/2011 |

(Continued)

Primary Examiner — Eric W Thomas
(74) Attorney, Agent, or Firm — Slater Matsil, LLP

(57) ABSTRACT

A capacitor component is disclosed. In an embodiment a capacitor component includes a winding having an oval core hole, which has a maximum diameter and a minimum diameter, wherein the minimum diameter is smaller than the maximum diameter, and wherein the winding is designed such that a deformation of the winding that occurs only locally is producible by a force acting punctiformly on the winding.

11 Claims, 2 Drawing Sheets

(56) References Cited

U.S. PATENT DOCUMENTS

2018/0269002 A1\* 9/2018 Yamazaki ............... B60L 50/51

FOREIGN PATENT DOCUMENTS

| | | |
|---|---|---|
| DE | 15412 C | 4/1881 |
| DE | 1614379 A1 | 7/1970 |
| DE | 245299 A1 | 4/1987 |
| DE | 69224411 T2 | 8/1998 |
| DE | 19929598 A1 | 1/2011 |
| EP | 0201771 A1 | 11/1986 |
| EP | 2372732 A1 | 10/2011 |
| JP | H0410519 A | 1/1992 |
| JP | H04361517 A | 12/1992 |
| JP | 2001102030 A | 4/2001 |
| JP | 2002175949 A | 6/2002 |
| JP | 2005093761 A | 4/2005 |
| JP | 2006120697 A | 5/2006 |
| JP | 2007081006 A | 3/2007 |
| JP | 2007258414 A | 10/2007 |
| JP | 2010251436 A | 11/2010 |
| JP | 2011216737 A | 10/2011 |

\* cited by examiner

CAPACITOR COMPONENT

This patent application is a national phase filing under section 371 of PCT/EP2016/082854, filed Dec. 29, 2016, which claims the priority of German patent application 10 2015 122 977.3, filed Dec. 30, 2015, each of which is incorporated herein by reference in its entirety.

TECHNICAL FIELD

The present invention relates to a capacitor component. The capacitor component can be, in particular, an electrolytic capacitor. The electrolytic capacitor can be, in particular, an electrolytic capacitor of the axial construction type.

SUMMARY OF THE INVENTION

Embodiments provide an improved capacitor component. For example, the improved capacitor component can be less susceptible to damage due to forces acting on a winding.

A capacitor component, which has a winding comprising an oval core hole, is proposed in an embodiment, wherein the core hole has a maximum diameter and a minimum diameter, which is smaller than the maximum diameter. The winding can be designed in such a way that a deformation of the winding that occurs only locally can be produced by a force acting on the winding at points.

Core hole in this case denotes an opening in the interior of the winding, which opening is free of the layers of the winding. The core hole may be created by virtue of the layers of the winding being wound around a mandrel, which is subsequently removed. In order to produce an oval core hole, an oval or flat mandrel can be used.

Both the oval configuration of the core hole and the design of the winding in such a way that deformations can occur in a locally confined manner make it possible to configure the capacitor component so as to be less susceptible to damage that can be created by forces acting on a winding.

Since a winding of a capacitor component is conventionally incorporated into a cylinder-shaped housing having a circular cross section, it is advantageous when the cross section of the winding has a substantially circular shape. The circular shape of the winding cross section can ensure that forces exerted on the winding by the housing are distributed symmetrically over the circumference of the winding. The oval design of the core hole now makes it possible to adapt the shape of the winding in a targeted manner. If, for example, the winding is widened in certain regions, for example, by the arrangement of an anode terminal or a cathode terminal, this effect can be balanced by a corresponding arrangement of the oval core hole. The oval core hole thus makes it possible to ensure that regions of the winding that have different widths are influenced substantially equally by forces acting on the winding.

A diameter of the core hole denotes in this case a connecting line, which connects two mutually opposite edge points of the core hole to one another and in the process runs through the center point of the core hole. The core hole has diameters of different sizes on account of its oval, non-circular shape. In particular, the core hole has a maximum diameter, which denotes the greatest spacing between two mutually opposite edge points of the core hole, wherein a connecting line of these points runs through the center point of the core hole. The minimum diameter accordingly denotes the smallest spacing between two mutually opposite edge points of the core hole, wherein the connecting line of these two points runs through the center point of the winding hole. In this case, the core hole is always viewed in a cross section, which is perpendicular to a winding axis about which the winding is wound.

Furthermore, the winding is designed in such a way that a deformation of the winding that occurs only locally can be produced by a force acting on the winding at points. A deformation that does not extend over the entire circumference of the winding but instead concerns only subregions of the winding can be considered here as a local deformation. In particular, the winding is designed in such a way that a force acting on the winding only at points does not lead to a deformation of the entire winding.

A force can then be referred to as a force acting at points when it does not act over the entire area of the winding but instead only in regions of the winding that are significantly smaller than the entire surface of the winding. A force that is exerted on the winding by a bead is also considered here as a force acting at points.

The deformation can be confined to local regions in various ways. For example, the winding can have an inner winding region that is free of electrodes and directly adjoins the oval core hole. Alternatively or in addition, the winding can have an oval core hole of particularly large design, which has, for example, a maximum diameter of at least 6 mm and/or a maximum diameter of at least 25% of the diameter of the winding. In both exemplary embodiments, therefore, an inner region of the winding is reduced in terms of its rigidity either by virtue of the fact that it merely has separator material or by virtue of the fact that it is free of material, with the result that said winding, in the region thereof with reduced stability, can absorb the force acting on the winding at points and can dissipate said forces in the form of a local deformation.

Such a force acting on the winding at points can be produced, for example, by a bead, which is formed in a housing in which the winding is arranged. The cylindrical winding can be held in the housing by the bead. The bead accordingly exerts a holding force on the winding in this case.

The winding can have weak spots, which lead to piercing of the winding in the case of mechanical deformations of the winding, for example, at selected welding locations at which anode terminals and cathode terminals are welded to the winding. In this case, an anode film comes into contact with a cathode film and it results in an electrical short circuit, which can lead to destruction of the capacitor component.

The capacitor component described above can prevent the occurrence of such piercing by reducing deformations of the winding.

The configurations of the capacitor component that are described here can thus reduce the risk of breakthrough of the winding. Piercing often occurs as a result of too great a deformation of the winding. However, as described above, the configurations of the winding that are described here can make it possible to locally confine such deformations. Other measures for preventing instances of breakthrough, for example, the use of particularly thick or dense separators, that is to say electrolytic papers, are accordingly not necessary to be able to prevent a short circuit. Instead, thin separators, that is to say electrolytic papers having a thickness of 40 to 60 μm can be used, said thin separators making it possible to design a capacitor component having a lower ESR (ESR=Equivalent Series Resistance). A capacitor component of this kind thus has a lower internal loss resistance and hence an improved efficiency.

In one exemplary embodiment, the winding can have an inner winding region that is free of electrodes, wherein the inner winding region adjoins the oval core hole in the radial direction toward the outside and has a diameter of at least 35% of the diameter of the winding, preferably of at least 45% of the diameter of the winding. In particular, the inner winding region can directly adjoin the oval core hole in the radial direction toward the outside.

The inner winding region can consist of a separator material. The inner winding region can consist of paper or electrolytic paper. The inner winding region can consist of paper and an electrolyte. The inner winding region can be substantially ring-shaped and surround the oval core hole. In the case of a substantially ring-shaped inner winding region, the diameter of the inner winding region given above denotes in this case the outer diameter of the ring.

Since the inner winding region is free of electrodes, it is maybe softer than the other regions of the winding that have electrodes. The inner winding region accordingly deforms more when a force is exerted on the winding. This accordingly makes it possible for the inner winding region to absorb said forces acting on the winding without causing deformations of and/or damage to the regions of the winding in which the electrodes are arranged. The risk of an electrical short circuit as a result of piercing of the winding is reduced in this way.

Alternatively or in addition, the maximum diameter of the core hole can be at least 6 mm and/or at least 25% of the diameter of the winding. The core hole can thus be designed to be larger than is necessary for the manufacture of the capacitor in a winding process. The large core hole functions in this case in a similar manner to the inner winding region. This makes it possible to absorb forces acting on the winding without causing deformations of the winding in the region in which the electrodes are formed. The maximum diameter of the core hole can also be at least 35% of the diameter of the winding.

Both the enlarged core hole and the formation of an inner winding region that is free of electrodes may appear to run counter to the usual aim in axial capacitors of increasing the capacitance by way of electrodes that are as large as possible. As discussed above, these exemplary embodiments made it possible however, to design a winding that is not susceptible to damage caused by forces acting on the winding. This advantage significantly compensates for the reduction in a maximum achievable capacitance.

The winding can have a diameter in the range of from 7 mm to 30 mm, preferably of from 10 mm to 22 mm. Diameters in this order of magnitude are entirely conventional in axial electrolytic capacitors. Said diameter is to be considered in connection with the diameter of the oval core hole. In this case, it appears that the oval core hole is designed to be so large that a considerable part of the winding remains free of material in the interior of said core hole. As a result, the rigidity of the winding is reduced and the winding becomes less susceptible to damage due to forces acting thereon.

The maximum diameter of the core hole can be at least 1 mm greater than the minimum diameter of the core hole. If the maximum diameter is at least 1 mm greater than the minimum diameter, it is possible, in the case of a corresponding alignment of the oval core hole, to compensate for the effect of the anode terminal and a cathode terminal leading to a deformation of a round winding.

The capacitor component can have an anode terminal and a cathode terminal, which are each contact-connected to the winding and which are arranged on mutually opposite sides of the core hole.

A connecting line between the anode terminal and the cathode terminal can be perpendicular to a line along the maximum diameter of the winding. The connecting line between the anode terminal and the cathode terminal can run parallel to a line along the minimum diameter of the winding. In this case, the winding is viewed in a cross section that is cut perpendicular to the winding axis. This alignment of the oval core hole with respect to the anode terminal and the cathode terminal ensures that the oval core hole compensates for the deformation of the winding by the terminals. It is accordingly possible to design a winding whose cross section is substantially circular.

The capacitor component can be an electrolytic capacitor.

BRIEF DESCRIPTION OF THE DRAWINGS

Embodiments of the invention are described in more detail in the following text with reference to the figures.

In the figures.

DETAILED DESCRIPTION OF ILLUSTRATIVE EMBODIMENTS

Figure 1:
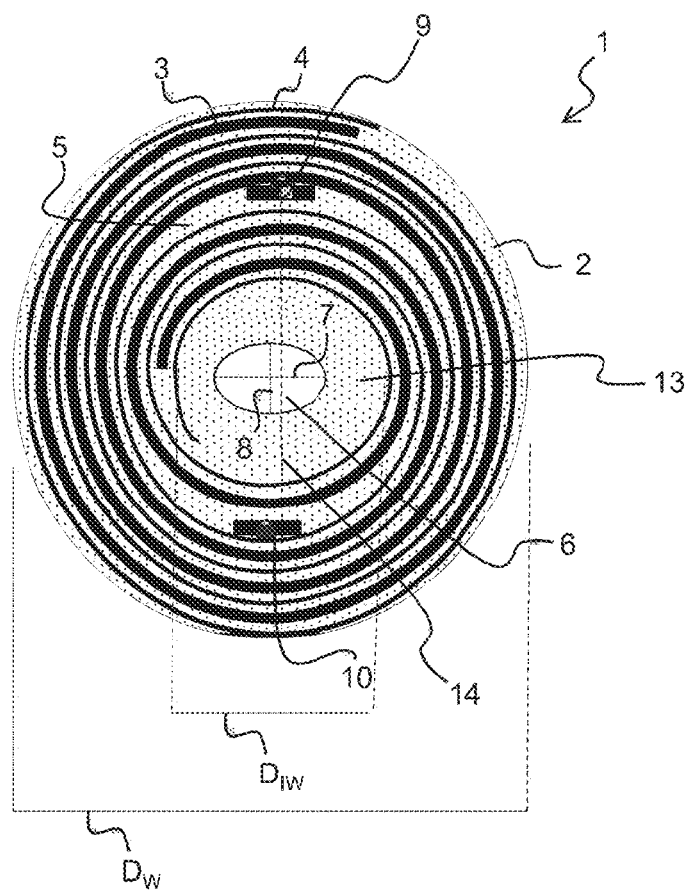
FIG. 1 shows a cross section through a capacitor component in accordance with a first exemplary embodiment.

FIG. 1 shows a first exemplary embodiment of a capacitor component 1. The capacitor component 1 has a winding 2. The winding 2 has layers of an anode film 3, a cathode film 4 and a separator 5, which are wound one above the other about a winding axis. The separator 5 can be paper. The anode film 3 and the cathode film 4 form in each case an electrode of the capacitor component. FIG. 1 shows the capacitor component 1 in a cross section, wherein the capacitor component 1 is cut open perpendicularly to the winding axis.

The capacitor component 1 has an oval core hole 6. The center point of the oval core hole 6 is situated at the center point of the winding 2. The oval core hole 6 has a maximum diameter 7 and a minimum diameter 8, wherein the minimum diameter 8 is smaller than the maximum diameter 7. Both the maximum diameter 7 and the minimum diameter 8 run through the center point of the oval core hole 6. The oval core hole 6 is produced by virtue of the layers of the winding 2 being wound around a flat or oval winding mandrel.

The capacitor component 1 also has an anode terminal 9 and a cathode terminal 10. The anode terminal 10 and the cathode terminal 10 are formed in each case in a strip-like manner. Said terminals extend in the direction of the winding axis. The anode terminal 9 is electrically contact-connected to the anode film 3. The cathode terminal 10 is electrically contact-connected to the cathode film 4. In both cases, the contact-connection is produced by welding. In particular, the anode terminal 9 can be welded to the anode film 3 in punctiform fashion at a plurality of locations. The cathode terminal 10 can be welded to the cathode film 4 in punctiform fashion at a plurality of locations.

In an alternative exemplary embodiment, the capacitor component 1 can have in each case a plurality of anode terminals 9, which are welded to the anode film 3, and a plurality of cathode terminals 10, which are welded to the cathode film 4.

Figure 2:
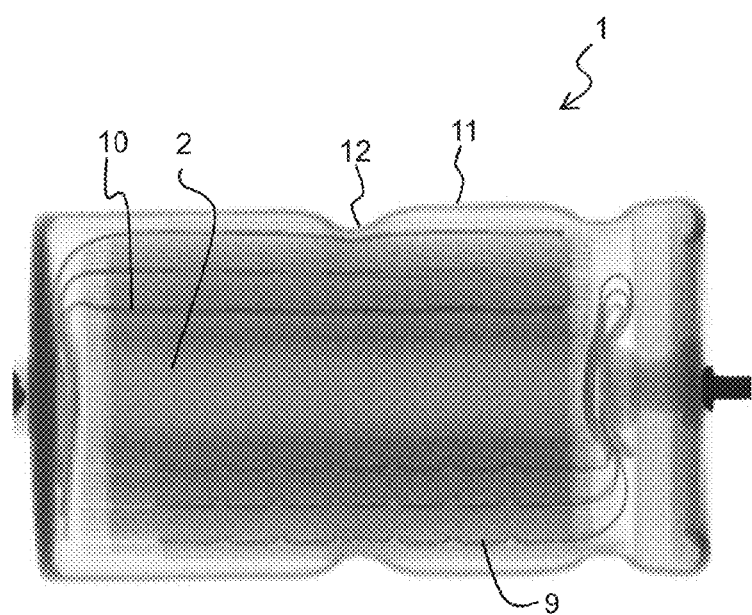
FIG. 2 shows an X-ray image of a capacitor component.

FIG. 2 shows an X-ray of such a capacitor component 1 in accordance with the alternative exemplary embodiment comprising a plurality of anode terminals 9 and a plurality of cathode terminals 10. It can be seen in FIG. 2 that the terminals 9, 10 are in each case connected at points to an anode film 3 and cathode film 4, respectively. These pointwise welding locations can produce unevennesses in the winding 2.

The winding 2 is arranged in a housing 11, which is substantially cylindrical. A bead 12 is formed in the housing 11. If a mechanical pressure is now exerted on the winding 2, for example, by the bead 12, particularly the uneven locations of the winding 2 produced by the pointwise welding of the terminals 9, 10 are in danger of being mechanically deformed by the pressure. The capacitor component 1 can lose dielectric strength due to mechanical deformations of this kind.

However, what is known as "piercing" poses an even more substantial risk. In this case, the layers of the winding 2 are deformed to such a great extent that the anode film 3 comes into direct contact with the cathode film 4 as a consequence of the mechanical deformation so that it results in an electrical short circuit. As will be explained in even greater detail in the following text, the winding 2 is designed in such a way that a deformation of this kind that is produced as a consequence of a force acting on the winding 2 at points remains locally confined. This can also prevent a plurality of deformations that occur at different locations of the winding 2 from reinforcing one another.

FIG. 1 shows that the winding 2 has an inner winding region 13 that is free of the anode film 3 and the cathode film 4. The inner winding region 13 directly adjoins the oval core hole 6. In the inner winding region 13, the winding 2 has only the layers of the separator 5. Said layers of the separator may be, in particular, paper and electrolyte. Since the anode film 3 and the cathode film 4 are not arranged in the inner winding region 13, the inner winding region 13 is free of the electrodes that are formed by said films 3, 4. The inner winding region 13 has a diameter $D_{IW}$ of at least 35% of the diameter $D_W$ of the winding 2, preferably of at least 45% of the diameter $D_W$.

Since the inner winding region 13 is free of electrodes, it has a lower mechanical strength. It is accordingly designed to be softer than the regions of the winding 2 that are located further to the outside. The entire winding 2 is therefore less rigid than would be the case for a winding in which the anode film 3 and the cathode film 4 were also arranged in the inner winding region 13. This leads to forces acting on the winding 2 at points leading only to local deformations of the winding 2. In particular, the winding 2 can be deformed, for example, in a section of the inner winding region 13 without other regions of the winding 2 being adversely affected thereby. The inner winding region 13 thus absorbs the acting force without it being passed on to other regions of the winding 2.

FIG. 1 furthermore shows that the anode terminal 9 and the cathode terminal 10 are arranged on mutually opposite sides of the core hole 6. In particular, a connecting line 14 between the anode terminal 9 and the cathode terminal 10 is perpendicular to the maximum diameter 8 of the core hole 6.

The anode terminal 9 and the cathode terminal 10 increase the extent of the winding 2 in the direction of the connecting line 14 of the two terminals 9, 10. In order to balance this effect, the oval core hole 6 is aligned in such a way that the connecting line 14 of the two terminals 9, 10 runs parallel to the minimum diameter 8 of the oval core hole 6. The widening of the winding 2 by the terminals 9, 10 is thus balanced by a core hole 6 designed to be thinner in this direction. A substantially circular cross section of the winding 2 can thus be achieved overall.

The circular cross section is often advantageous since housings 11 for capacitor components 1 usually have a circular cross section. If the winding 2 is incorporated into a housing 11 having a circular cross section, a circular winding 2 has the advantage that mechanical forces exerted by the housing 11 are distributed evenly across the circumference of the winding 2. Forces of this kind can be exerted, in particular, by beads 12 incorporated into the housing 11. If the shape of the winding 2 were to deviate to too great an extent from a circular shape, said forces would be distributed unevenly, which would have a disadvantageous effect on the vibration resistance of the capacitor component 1.

Figure 3A:
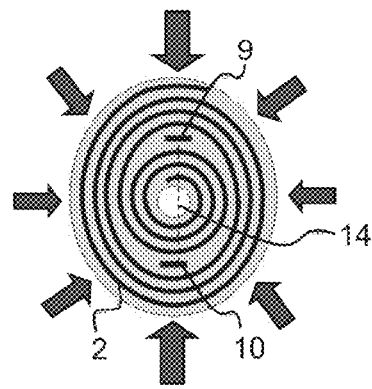
FIGS. 3A and 3B show the distribution of the forces, which housings are exerted on the windings of capacitor components.
Figure 3B:
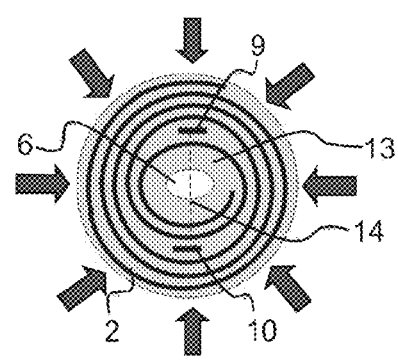

FIGS. 3A and 3B show the distribution of the forces, which, after the insertion of the winding 2 into a housing 11 with a bead 12, acts on the respective winding 2. To simplify the illustration, the cathode film 4 has not been drawn in FIGS. 3A and 3B.

Here, FIG. 3A shows a capacitor component 1, which has a round core hole and no inner winding region 13 that is free of electrodes. FIG. 3A shows that particularly high mechanical forces act on the winding 2 along the connecting line 14 of the anode terminal 9 to the cathode terminal 10. There is accordingly an asymmetrical force distribution, which negatively influences the vibration resistance of the capacitor component 1.

FIG. 3B, in contrast, shows the force distribution in the case of a winding 2 comprising an oval core hole 6 and an inner winding region 13 that is free of electrodes. It can be seen that now considerably lower mechanical forces act on the winding 2 along the connecting line 14 from the anode terminal 9 and cathode terminal 10 in comparison to FIG. 3A. There is accordingly a substantially more symmetrical force distribution, with the result that the winding 2 has an improved vibration resistance.

The oval core hole 6 and the inner winding region 13 thus lead to technical effects that support one another. By aligning the oval core hole 6 in such a way that the minimum diameter 8 coincides with the connecting line 14 of the anode terminal 9 to the cathode terminal 10, a virtually circular cross section of the winding 2 is achieved, which brings about an even distribution of the forces acting on the winding 2. Furthermore, the inner winding region 13 ensures that the deformation produced by the forces can be absorbed and that said deformation occurs only locally without negatively influencing the entire winding 2. The capacitor component 1 is thus overall particularly insusceptible to damage caused by forces exerted on the winding 2.

Figure 4:
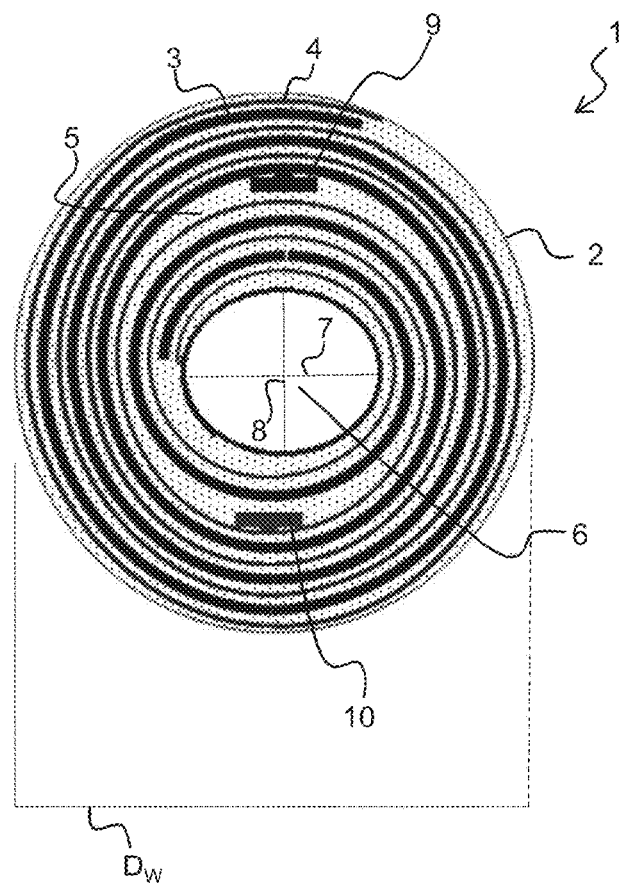
FIG. 4 shows a cross section through a capacitor component in accordance with a second exemplary embodiment.

FIG. 4 shows a second exemplary embodiment of the capacitor component 1 in which the core hole 6 has a larger maximum diameter 7 than is necessary for the winding process. For example, the core hole 6 can have a maximum diameter 7 of at least 6 mm. Alternatively or in addition, the core hole 6 can have a maximum diameter 7 of at least 25% of the diameter $D_W$ of the winding 2, preferably of at least 35% of the diameter $D_W$ of the winding 2. In this case, the winding 2 can have a diameter in the range of from 5 mm to 30 mm, preferably of from 10 mm to 22 mm.

This oval core hole 6 of particularly large design causes the winding 2 to be less rigid—exactly like the inner winding region 13 that is free of electrodes in the first exemplary embodiment. The oval core hole 6 of particularly large design accordingly permits local deformations as a consequence of forces acting on the winding 2 at points.

The invention claimed is:

1. A capacitor component comprising:
   a winding comprising an oval core hole, which has a maximum diameter and a minimum diameter,
   wherein the minimum diameter is smaller than the maximum diameter,
   wherein the winding has an inner winding region that is free of electrodes,
   wherein the inner winding region adjoins the oval core hole in a radial direction toward the outside and has a diameter of at least 35% of a diameter of the winding, and
   wherein the inner winding region consists essentially of paper and an electrolyte.

2. The capacitor component according to claim 1, wherein the inner winding region has a diameter of at least 45% of the diameter of the winding.

3. The capacitor component according to claim 1, wherein the maximum diameter of the core hole is at least 6 mm and/or at least 25% of the diameter of the winding.

4. The capacitor component according to claim 1, wherein the maximum diameter of the core hole is at least 35% of a diameter of the winding.

5. The capacitor component according to claim 1, wherein the winding has a diameter in a range of from 7 mm to 30 mm.

6. The capacitor component according to claim 1, wherein the winding has a diameter in a range of from 10 mm to 22 mm.

7. The capacitor component according to claim 1, wherein the maximum diameter of the core hole is at least one millimeter greater than the minimum diameter.

8. The capacitor component according to claim 1, wherein the capacitor component has an anode terminal and a cathode terminal, wherein each anode terminal and cathode terminal are contact-connected to the winding and are arranged on mutually opposite sides of the core hole.

9. The capacitor component according to claim 8, wherein a connecting line between the anode terminal and the cathode terminal is perpendicular to the maximum diameter of the winding.

10. The capacitor component according to claim 1, wherein the capacitor component is an electrolytic capacitor.

11. The capacitor component according to claim 1, further comprising a housing, wherein a bead is formed in the housing, wherein the winding is arranged in the housing and wherein the winding is held in the housing by the bead.

* * * * *